(12) United States Patent
Oliveira et al.

(10) Patent No.: US 12,003,378 B1
(45) Date of Patent: Jun. 4, 2024

(54) SYSTEMS AND METHODS FOR PREDICTIVE SCALING OF EDGE ENTITIES

(71) Applicant: Dell Products L.P., Round Rock, TX (US)

(72) Inventors: Ana Cristina Bernardo De Oliveira, Rio de Janeiro (BR); André Ricardo de Carvalho Saraiva, Saquarema (BR); Anselmo Luiz Éden Battisti, Niterói (BR); Antonio Augusto de Aragão Rocha, Niterói (BR); Flávia Coimbra Delicato, Niterói (BR); Ian Vilar Bastos, Jacarepaguá (BR); Paulo de Figueiredo Pires, Niterói (BR); Thais Vasconcelos Batista, Natal (BR); Thiago Pereira da Silva, Barra do Garças (BR); Evandro Luiz Cardoso Macedo, Cocotá (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/083,129

(22) Filed: Dec. 16, 2022

(51) Int. Cl.
  *H04L 41/0895* (2022.01)
  *H04L 43/04* (2022.01)
  *H04L 43/16* (2022.01)

(52) U.S. Cl.
  CPC .......... *H04L 41/0895* (2022.05); *H04L 43/04* (2013.01); *H04L 43/16* (2013.01)

(58) Field of Classification Search
  CPC .............. H04L 41/0895; H04L 41/0896; H04L 41/0897; H04L 41/122; H04L 41/145; H04L 43/04; H04L 43/16; H04L 67/566
  See application file for complete search history.

(56) References Cited

U.S. PATENT DOCUMENTS

| | | | |
|---|---|---|---|
| 2017/0318097 A1* | 11/2017 | Drew | H04L 41/0897 |
| 2018/0123930 A1* | 5/2018 | Zhang | H04L 43/55 |
| 2019/0079804 A1* | 3/2019 | Thyagarajan | G06F 9/5077 |
| 2019/0306051 A1* | 10/2019 | Seetharaman | H04L 45/22 |
| 2023/0081375 A1* | 3/2023 | Bharti | H04W 24/08 |
| | | | 370/216 |
| 2023/0261952 A1* | 8/2023 | Chamarthi | H04L 41/0895 |
| | | | 709/221 |

OTHER PUBLICATIONS

Jeffrey Kephart et al., The Vision of Autonomic Computing, Cover Feature, Jan. 14, 2003 (10 pages).

(Continued)

*Primary Examiner* — Emmanuel L Moise
*Assistant Examiner* — Xiang Yu
(74) *Attorney, Agent, or Firm* — Chamberlain, Hrdlicka, White, Williams & Aughtry; Aly Z. Dossa

(57) ABSTRACT

A method for scaling a virtual network function (VNF) by analyzing VNF metrics data, the method that includes obtaining, by a computing device, a VNF metrics data, identifying a queue in the VNF metrics data, calculating a constraint violation probability based on the queue, making a first determination that the constraint violation probability is greater than an upper threshold, and based on the first determination, scaling up the VNF.

3 Claims, 6 Drawing Sheets

(56) References Cited

OTHER PUBLICATIONS

Arcaini et al., Modeling and Analyzing MAPE-K Feedback Loops for Self-adaptation, 10th International Symposium on Software Engineering for Adaptive and Self-Managing Systems, May 18, 2019 (11 pages).

Chenhao Qu et al., Auto-Scaling Web Applications in Clouds: A Taxonomy and Survey, ACM Computing Surveys, Jul. 13, 2018, vol. 51, No. 4, Article 73 (33 pages).

Einollah Jafarnejad Ghomi et al., Applying queue theory for modeling of cloud computing: A systematic review, Research Article, Mar. 7, 2019, (31 pages).

Robert B. Cooper, Queueing Theory, A 90-Minute Tutorial, Nov. 9-11, 1981 (4 pages).

Salman Taherizadeh et al., Auto-scaling Applications in Edge Computing: Taxonomy and Challenges, Dec. 20, 2017 (6 pages).

\* cited by examiner

SYSTEMS AND METHODS FOR PREDICTIVE SCALING OF EDGE ENTITIES

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

DETAILED DESCRIPTION

General Notes

Figure 1:
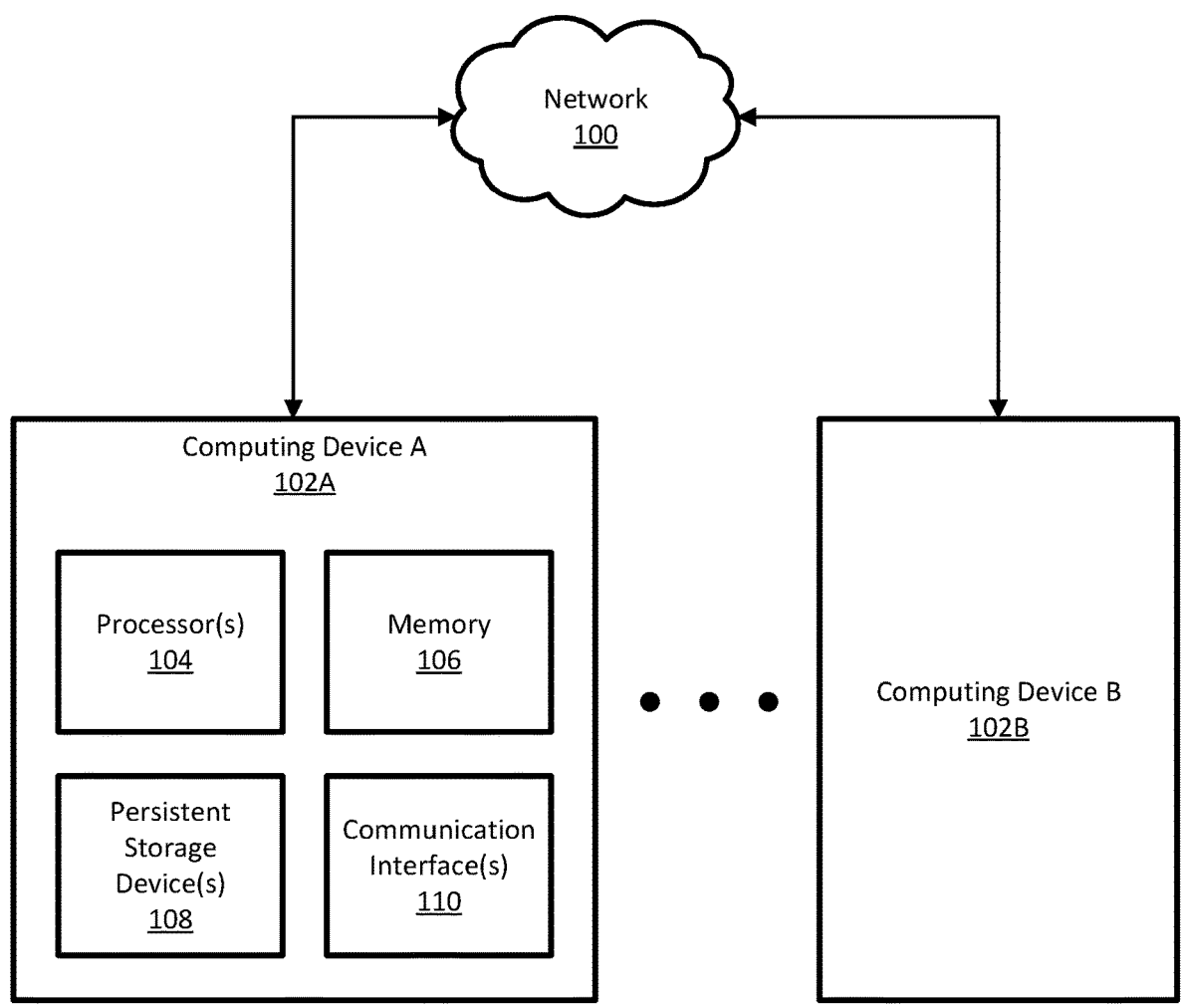
FIG. 1 shows a diagram of a system, in accordance with one or more embodiments.

As it is impracticable to disclose every conceivable embodiment of the described technology, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, certain technical details, known to those of ordinary skill in the art, may be omitted for brevity and to avoid cluttering the description of the novel aspects.

For further brevity, descriptions of similarly-named components may be omitted if a description of that similarly-named component exists elsewhere in the application. Accordingly, any component described with regard to a specific figure may be equivalent to one or more similarly-named components shown or described in any other figure, and each component incorporates the description of every similarly-named component provided in the application (unless explicitly noted otherwise). A description of any component is to be interpreted as an optional embodiment—which may be implemented in addition to, in conjunction with, or in place of an embodiment of a similarly-named component described for any other figure.

Lexicographical Notes

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

Overview and Advantages

In general, this application discloses one or more embodiments of systems and methods for algorithmically auto-scaling edge entities (e.g., virtual network functions) executing on edge devices, where the probability of the need to scale the edge entity is determined using the mathematics of queue theory.

The emergence of applications with heterogeneous demands has required the evolution of computer networking technologies. Accordingly, it is advantageous to accommodate a wide variety of services on a common infrastructure, like the infrastructure available at the "edge" of the network. However, to achieve the agility and cost savings required to meet application demands, networks need to be modified to accommodate how such services are delivered. Thus, in order to provide more agility and flexibility for service provisioning (while reducing deployment costs for infrastructure providers), typical network functions (e.g., multiple access, caching, firewall, etc.) are implemented as software entities called virtual network functions (VNFs). In turn, VNFs provide the versatility to execute on virtual machines (VMs) or containers using standard, off-the-rack computing devices. Consequently, the demand for dedicated hardware to execute specialized network functions is reduced, allowing for the greater versatility, flexibility, and cost-efficiency of more standard computing devices at the network's edge.

Further, the integration of VNFs into edge computing allows the creation of VNF chains (also known as service function chains (SFC)) that utilize multiple VNFs consecutively "chained" together to perform a larger, ordered process. Accordingly, the more complex and specialized services—offered by SFCs—are able to take advantage of the lower latency, flexibility, and scalability provided by the standard edge computing devices.

Yet, problems may arise as edge devices often include components with heterogeneous processor and memory capacities, which are burdened to support a vast array of protocols and integrations (often included to maintain wide compatibility). That is, edge devices are not typically dedicated to specialized tasks and their available resource capacity varies (e.g., as traffic increases, services are demanded, virtual instances are created, terminated, migrated, or scaled, etc.). In comparison with cloud computing devices, edge devices tend to provide fewer stable services if they are located in unreliable environments. Consequently, relying on human intervention to dynamically scale VNFs in edge environments (with an unpredictable workload) is infeasible—and likely lead to service interruptions. Accordingly, scaling VNFs requires the cooperation of a variety of automated components in order to meet the minimum performance constraints required for an SFC.

As disclosed in one or more embodiments herein, systems and methods for automatically scaling edge entities (e.g., VNFs) are provided. The auto-scaling mechanism is capable of dynamically allocating and deallocating computing resources to a VNF, in response to workload fluctuation and resource utilization. One goal of such an auto-scaling mechanism is to adapt the system to meet workload demand and optimize the use of resources without human intervention.

To perform the analysis and operations described herein, a monitoring, analyzing, planning, and execution (MAPE) workflow architecture is utilized that further incorporates a shared "knowledge" (MAPE-K) to provide autonomous properties for auto-scaling through a control loop. In addition, a prediction method is provided that incorporates "queue theory" to proactively calculate the probability that a VNF is going to fall out of compliance with the provided constraints.

Specifically, as discussed in one or more embodiments herein, the prediction model uses the M/M/1 queue model (Markovian arrival, Markovian service, 1 channel) to calculate the queue lengths, waiting times, and probability of a packet processing time exceeding the defined maximum constraint. In turn, the calculated probability is used as the value to trigger the auto-scaling procedure via two thresholds—an "upper" threshold for scaling-up the burdened VNF, and a "lower" threshold for scaling-down the VNF (as under-utilized resources are allocated thereto). Accordingly, by automatically and dynamically scaling VNFs, the computing resources of the edge devices are best optimized to allow the VNFs to operate within the provided constraints.

FIG. 1

FIG. 1 shows a diagram of a system, in accordance with one or more embodiments. In one or more embodiments, a system may include a network (100) and one or more computing device(s) (102). Each of these components is described below.

In one or more embodiments, a network (e.g., network (100)) is a collection of connected network devices (not shown) that allow for the communication of data from one network device to other network devices, or the sharing of resources among network devices. Non-limiting examples of a network (e.g., network (100)) include a local area network (LAN), a wide area network (WAN) (e.g., the Internet), a mobile network, any combination thereof, or any other type of network that allows for the communication of data and sharing of resources among network devices and/or computing devices (102) operatively connected to the network (100). One of ordinary skill in the art, having the benefit of this detailed description, would appreciate that a network is a collection of operatively connected computing devices that enables communication between those computing devices.

In one or more embodiments, a computing device (e.g., computing device A (102A), computing device B (102B)) is hardware that includes any one, or combination, of the following components:

(i) processor(s) (104),
(ii) memory (106) (volatile and/or non-volatile),
(iii) persistent storage device(s) (108),
(iv) communication interface(s) (110) (e.g., network ports, small form-factor pluggable (SFP) ports, wireless network devices, etc.),
(v) internal physical interface(s) (e.g., serial advanced technology attachment (SATA) ports, peripheral component interconnect (PCI) ports, PCI express (PCIe) ports, next generation form factor (NGFF) ports, M.2 ports, etc.),
(vi) external physical interface(s) (e.g., universal serial bus (USB) ports, recommended standard (RS) serial ports, audio/visual ports, etc.),
(vii) input and output device(s) (e.g., mouse, keyboard, monitor, other human interface devices, compact disc (CD) drive, other non-transitory computer readable medium (CRM) drives).

Non-limiting examples of a computing device (102) include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device (102) with the aforementioned capabilities. In one or more embodiments, a computing device (102) may be operatively connected to another computing device (102) via a network (100). In one or more embodiments, a computing device (102) may be considered an "edge" device, a "core" device, or a "cloud" device.

In one or more embodiments, a processor (e.g., processor (104)) is an integrated circuit for processing computer instructions. In one or more embodiments, the persistent storage device(s) (108) (and/or memory (106)) of the computing device (102) may store computer instructions (e.g., computer code) which, when executed by the processor(s) (104) of the computing device (102) (e.g., as software), cause the computing device (102) to perform one or more processes specified in the computer instructions. A processor (104) may be one or more processor cores or processor micro-cores.

In one or more embodiments, memory (e.g., memory (106)) is one or more hardware devices capable of storing digital information (e.g., data) in a non-transitory medium. In one or more embodiments, when accessing memory (106), software may be capable of reading and writing data at the smallest units of data normally accessible (e.g., "bytes"). Specifically, in one or more embodiments, memory (106) may include a unique physical address for each byte stored thereon, thereby enabling software to access and manipulate data stored in memory (106) by directing commands to a physical address of memory (106) that is associated with a byte of data (e.g., via a virtual-to-physical address mapping).

In one or more embodiments, a persistent storage device (e.g., persistent storage device(s) (108)) is one or more hardware devices capable of storing digital information (e.g., data) in a non-transitory medium. Non-limiting examples of a persistent storage device (108) include integrated circuit storage devices (e.g., solid-state drive (SSD), non-volatile memory express (NVMe), flash memory, etc.), magnetic storage (e.g., hard disk drive (HDD), floppy disk, tape, diskette, etc.), or optical media (e.g., compact disc (CD), digital versatile disc (DVD), etc.). In one or more embodiments, prior to reading and/or manipulating data located on a persistent storage device (108), data may first be required to be copied in "blocks" (instead of "bytes") to other, intermediary storage mediums (e.g., memory (106)) where the data can then be accessed in "bytes".

In one or more embodiments, a communication interface (e.g., communication interface (110)) is a hardware component that provides capabilities to interface a computing device with one or more devices (e.g., through a network (100) to another computing device (102), another server, a network of devices, etc.) and allow for the transmission and receipt of data with those devices. A communication interface (110) may communicate via any suitable form of wired interface (e.g., Ethernet, fiber optic, serial communication etc.) and/or wireless interface and utilize one or more protocols for the transmission and receipt of data (e.g., transmission control protocol (TCP)/internet protocol (IP), remote direct memory access (RDMA), Institute of Electrical and Electronics Engineers (IEEE) 801.11, etc.).

In one or more embodiments, a computing device (102) may execute one or more software instances (e.g., via processor(s) (104) and memory (106)) that read and write to data stored on one or more persistent storage device(s) (108) and memory (106). Software instances may utilize resources from one or more computing device(s) (102) simultaneously and may move between computing devices, as commanded (e.g., via network (100)). Additional details regarding software instances and data may be found in the description of FIG. 2.

While a specific configuration of a system is shown, other configurations may be used without departing from the disclosed embodiment. Accordingly, embodiments disclosed herein should not be limited to the configuration of devices and/or components shown.

FIG. 2

Figure 2:
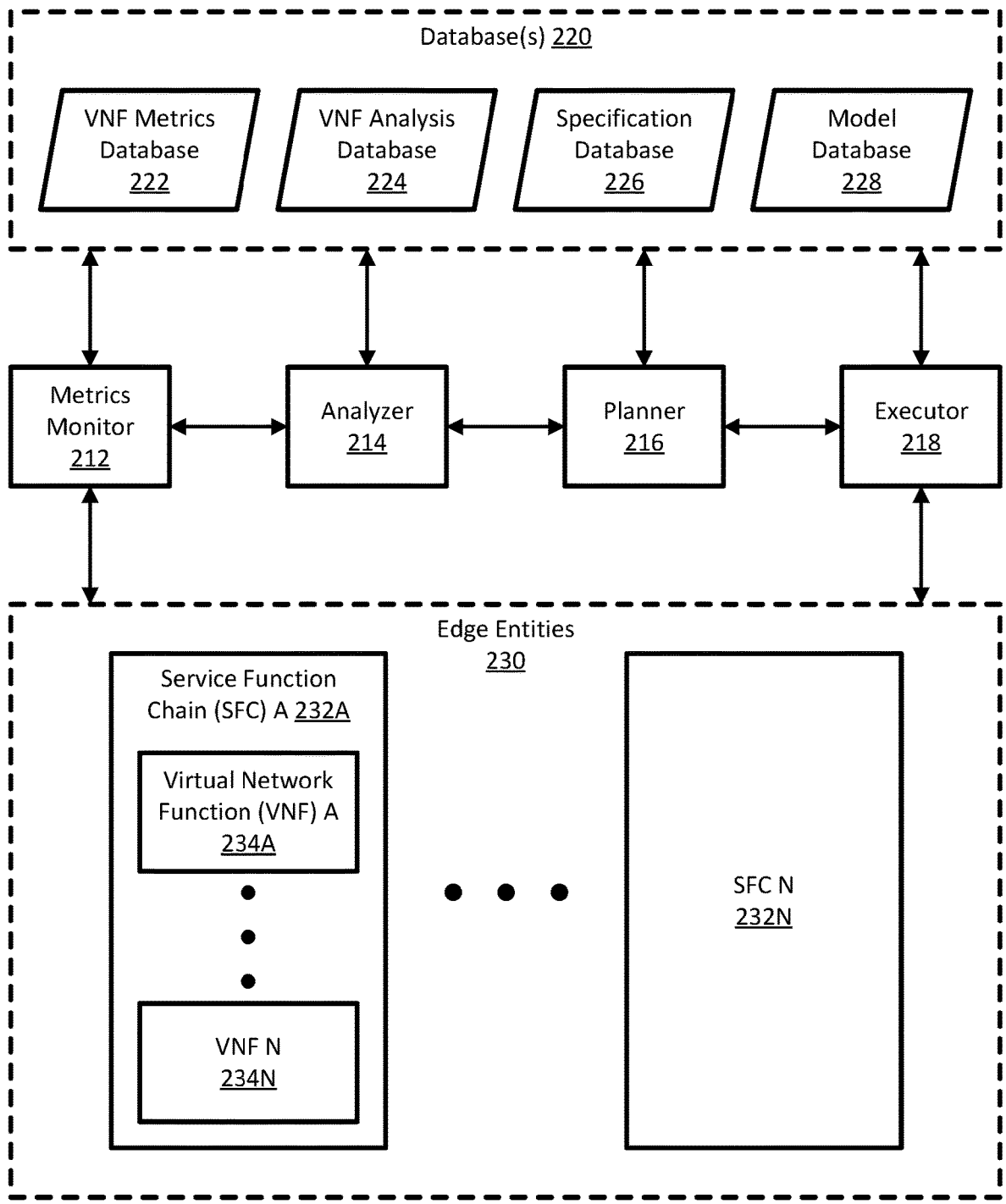
FIG. 2 shows a diagram of a virtualized system, in accordance with one or more embodiments.

FIG. 2 shows a diagram of a virtualized system, in accordance with one or more embodiments. In one or more embodiments, a virtualized system may include one or more database(s) (220), one or more software entities (e.g., metrics monitor (212), analyzer (214), planner (216), and executor (218)), and edge entities (230). Each of these components is described below.

In one or more embodiments, a database (e.g., database(s) (220)) is a collection of data stored on a computing device, which may be grouped (physically or logically). Non-limiting examples of a database (220) include a VNF metrics database (222), a VNF analysis database (224), a specification database (226), and a model database (228). Although the VNF metrics database (222), VNF analysis database (224), specification database (226), and model database (228) are shown as four distinct databases in FIG. 2, any combination of the four databases (220) be combined into a single database (not shown) that includes some or all of the data of any of the individual databases. The collection of databases (220) may be considered a shared "knowledge" among the software entities. Additional details regarding the databases (220) may be found in the description of FIGS. 3A-3D.

In one or more embodiments, a metrics monitor (e.g., metrics monitor (212)) is software, executing on a computing device, which obtains (gathers, collects, organizes) VNF metrics from one or more VNF(s) (232) and stores that data in the VNF metrics database (222). Additional details regarding the functions of the metrics monitor (212) may be found in the description of FIGS. 4-6.

In one or more embodiments, an analyzer (e.g., analyzer (214)) is software, executing on a computing device, which uses the VNF metrics data to calculate VNF analysis data and store that data in the VNF analysis database (224). Additional details regarding the functions of the analyzer (214) may be found in the description of FIGS. 4-6.

In one or more embodiments, a planner (e.g., planner (216)) is software, executing on a computing device, which uses the VNF analysis data to calculate one or more probabilities and compare those probabilities to thresholds stored in the specification database (226). Additional details regarding the functions of the planner (216) may be found in the description of FIGS. 4-6.

In one or more embodiments, an executor (e.g., executor (218)) is software, executing on a computing device, which uses the probabilities and comparison data (calculated by the planner (216)) to cause one or more action(s) to be performed on a VNF (234) (e.g., to scale-up or scale-down the resources of the VNF (234)). Additional details regarding the functions of the executor (218) may be found in the description of FIGS. 4-6.

Although the metrics monitor (212), analyzer (214), planner (216), and executor (218) are shown as four distinct software entities, any combination of the four software entities may be combined into a single software entity that performs some or all of the functions of any of the four entities.

In one or more embodiments, an edge entity (e.g., edge entities (230)) is software executing on a computing device. In one or more embodiments, an edge entity (230) is a virtual network function (VNF) (VNF A (234A), VNF B (234B)) that virtualizes a distinct network function into a discrete software instance. Further, a VNF (234) may execute in an isolated and containerized environment that allows for rapid deployment, scaling, and termination of the software. Non-limiting examples of a VNF's (234) functionality (or "VNF type") include a firewall, dynamic host configuration protocol (DHCP) server, WAN translator, load balancer, packet inspector, quality-of-service (QoS) enforcer, multicast mechanism, multiple access, caching, or any other function that may be performed by a network device.

In one or more embodiments, one or more VNF(s) (234) may be logically grouped into a service function chain (SFC) (e.g., SFC A (232A), SFC N (232N)) based on a workflow of the individual VNFs (234) in the SFC (232). As a non-limiting example, there may be three VNFs (234), a first VNF (234) for routing WAN traffic, a second VNF (234) for decrypting encrypted packets, and a third VNF (234) for multicasting the decrypted packets to a specific list of IP addresses. In such a setup, the three VNFs (234) are "chained" together to process packets consecutively (handled by the first, second, then third VNFs (234), in order). Accordingly, those three VNFs (234) may be logically grouped into a single SFC (232) that "performs" the combined/overall function (receiving encrypted packets via WAN, decrypting them, and then multicasting those packets).

While a specific configuration of a system is shown, other configurations may be used without departing from the disclosed embodiment. Accordingly, embodiments disclosed herein should not be limited to the configuration of devices and/or components shown.

FIG. 3A

Figure 3A:
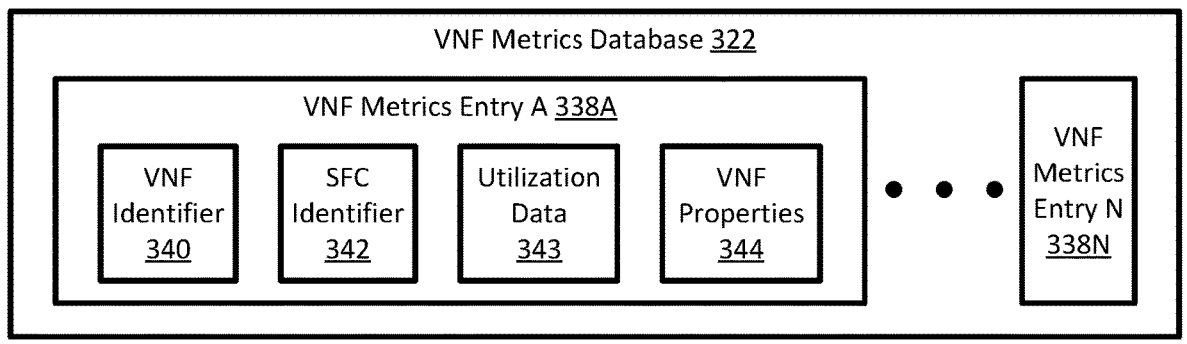
FIG. 3A shows a diagram of a VNF metrics database, in accordance with one or more embodiments.

FIG. 3A shows a diagram of a VNF metrics database, in accordance with one or more embodiments. In one or more embodiments, a VNF metrics database (322) is a data structure that includes one or more VNF metrics entries (e.g., VNF metrics entry A (338A), VNF metrics entry N (338N)). In one or more embodiments, a VNF metrics entry (338) is a data structure uniquely associated with a single VNF that may include (or otherwise be associated with):
  (i) a VNF identifier (340) that allows for the unique identification of a single VNF associated with the metrics entry (338) (non-limiting examples of an identifier include a tag, an alphanumeric entry, a filename, and a row number in table),
  (ii) an SFC identifier (342) that allows for the unique identification of a single SFC associated with the metrics entry (338) (and with the VNF),
  (iii) utilization data (343) that includes measurements of computing resources currently utilized by the VNF. Non-limiting examples of utilization data (343) include processor utilization, memory utilization, process time for a packet, and information related to a queue of packets currently being processed by the VNF (e.g., queue capacity, queue utilization, number of packets in the queue, timestamp for packets entering and exiting the queue),
  (iv) VNF properties (344) that includes the current configuration of the computing resources allocated to the VNF. Non-limiting examples of VNF properties (344) include allocated CPU capacity, allocated memory capacity, a unique identifier for the host device, and the VNF type (e.g., the functionality performed by the VNF), or
  (v) any combination thereof.

In one or more embodiments, any or all of the data within a single VNF metrics entry (338) may be generally referred to as "VNF metrics" associated with a single VNF.

FIG. 3B

Figure 3B:
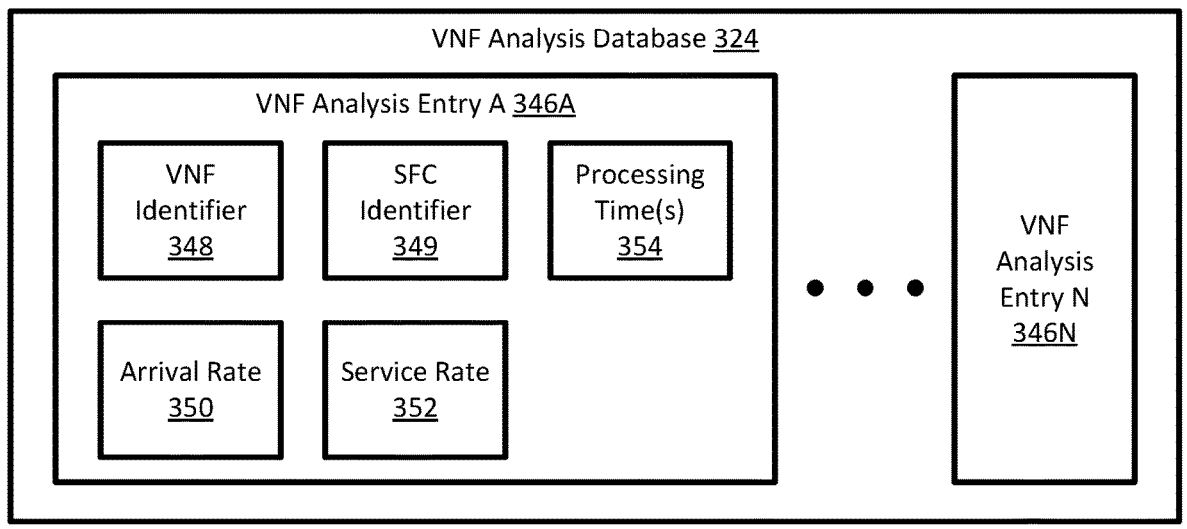
FIG. 3B shows a diagram of a VNF analysis database, in accordance with one or more embodiments.

FIG. 3B shows a diagram of a VNF analysis database, in accordance with one or more embodiments. In one or more embodiments, a VNF analysis database (324) is a data structure that includes one or more VNF analysis entries (e.g., VNF analysis entry A (346A), VNF analysis entry N (346N)). In one or more embodiments, a VNF analysis entry (346) is a data structure uniquely associated with a single VNF that may include (or otherwise be associated with):
  (i) a VNF identifier (348) that allows for the unique identification of a single VNF associated with the VNF analysis entry (346),
  (ii) an SFC identifier (349) that allows for the unique identification of a single SFC associated with the VNF analysis entry (346),
  (iii) an arrival rate (350) that is a measurement of the frequency at which packets arrive at the associated VNF. The arrival rate (350) may be measured in occurrences (i.e., arrivals) per unit time (e.g., 1 millisecond, 1 minute, etc.),
  (iv) a service rate (352) that is a measurement of the frequency at which packets exit the VNF associated with the VNF analysis entry (346) after successfully being serviced by the VNF. The service rate (352) may be measured in occurrences (i.e., services) per unit time (e.g., 1 millisecond, 1 minute, etc.),
  (v) processing time(s) (354) that are measurements of the duration of how long one or more packet(s) reside at the VNF associated with the VNF analysis entry (346). A processing time may be measured from the time when packet arrives at the VNF to when that same packet departs the VNF, or
  (vi) any combination thereof.

FIG. 3C

Figure 3C:
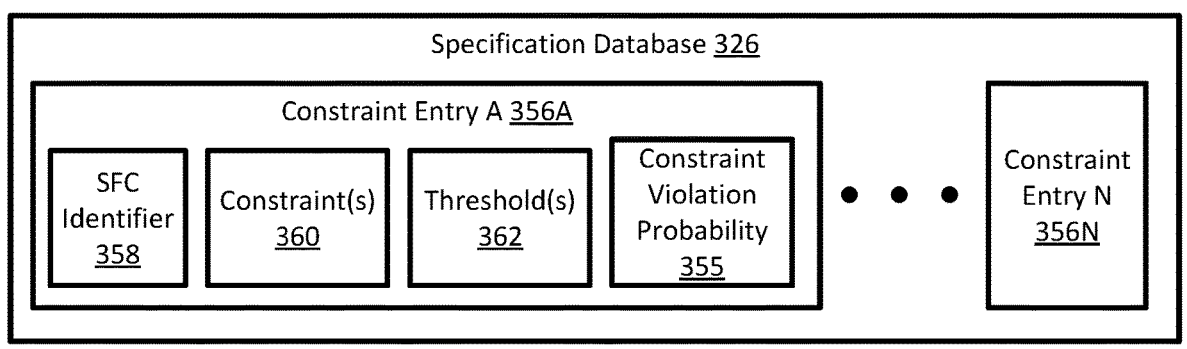
FIG. 3C shows a diagram of a specification database, in accordance with one or more embodiments.

FIG. 3C shows a diagram of a specification database, in accordance with one or more embodiments. In one or more embodiments, a specification database (326) is a data structure that includes one or more constraint entries (e.g., constraint entry A (356A), constraint entry N (356N)). In one or more embodiments, a constraint entry (356) is a data structure uniquely associated with a single SFC that may include (or otherwise be associated with):
  (i) an SFC identifier (358) that allows for the unique identification of a single SFC associated with the constraint entry (356),
  (ii) one or more constraint(s) (360) that specify one or more maximum/minimum allowable metrics for the associated SFC (i.e., for each of the VNFs in the SFC). Non-limiting examples of a constraint include (i) a maximum allowable processing time for each packet handled by the SFC (e.g., 1 second), (ii) an average processing time for packets handled by the SFC (e.g., 500 milliseconds), (iii) a minimum amount of computing resources (e.g., processor capacity, memory capacity, etc.) assigned to the SFC i.e. In one or more embodiments, a constraint (360) may be specified by a service-level agreement (SLA) for which the operator of the computing device is contractually obligated to adhere,
  (iii) one or more threshold(s) (362) that provide one or more values against which the constraint violation probability (355) is compared. In one or more embodiments, there is a an "upper threshold" that is used to determine whether a VNF (in the SFC) needs to be scaled-up, and a "lower threshold" that is used to determine whether a VNF (in the SFC) may be scaled-down. In one or more embodiments, the thresholds (362) may be measured in percentages (e.g., from 0% to 100%) or in decimal form (e.g., from 0.00 to 1.00),
  (iv) a constraint violation probability (355) that is the probability that an SFC is going to violate a constraint (360). In one or more embodiments, a constraint violation probability may be calculated using the utilization data (343) for each VNF in a given SFC. In one or more embodiments, the constraint violation probability (355) may be measured in percentages (e.g., from 0% to 100%) or in decimal form (e.g., from 0.00 to 1.00),
  (v) any combination thereof.

FIG. 3D

Figure 3D:
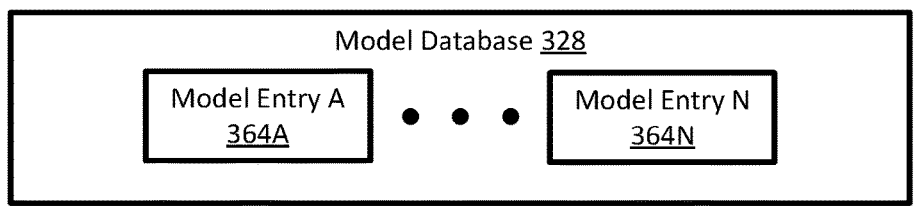
FIG. 3D shows a diagram of a model database, in accordance with one or more embodiments.

FIG. 3D shows a diagram of a model database, in accordance with one or more embodiments. In one or more embodiments, a model database (328) is a data structure that may include one or more model entries (e.g., model entry A (364A), model entry N (364N)). In one or more embodiments, a model entry (364) is a data structure that uniquely provides the properties of a model, algorithm, or procedural analysis to be performed on data.

In one or more embodiments, as a non-limiting example, a model entry (364) may include computer instructions (i.e., a program to be executed by the analyzer and/or planner) for calculating processing time(s) (354), an arrival rate (350), a service rate (352), and/or a constraint violation probability (355).

Further, the model entry (364) may specify the formulas/equations needed to calculate one or more properties using (as a non-limiting example) queue theory, including:

$$d^v = \left(d^s - \sum_{l \in s} d_l^s\right)\left(\frac{CPU^v}{\sum_{v' \in s} CPU^{v'}}\right)$$

where,
(i) $d^v$ is the maximum processing delay for a selected VNF,
(ii) $d^s$ is the maximum delay for the SFC overall,
(iii) $\Sigma_{l \in s} \, d_l^s$ is the sum of all "link" delays between all VNFs in the SFC (e.g., durations of time spent processing packets between chained VNFs),
(iv) $CPU^v$ is the number of processor instructions for the selected VNF,
(v) $\Sigma_{v' \in s} CPU^{v'}$ is the sum of processor instructions for all VNFs in the SFC, $$\mu^v = \frac{CPU^v}{\sum_j^m ps_j^v * CPU^{pkt}}$$

where,
(i) $\mu^v$ is the service rate (352) for a selected VNF,
(ii) $\Sigma_j^m ps_j^v$ is the sum of each packet size of the processed packets (m)
(iii) $CPU^{pkt}$ is the number of processor instructions required to process packets, $$T_W^v = \begin{cases} X, T_{P_1}^v, T_{P_2}^v, T_{P_3}^v, \ldots, T_{P_k}^v & \text{if } k \geq 1 \\ T_{P_1}^v & \text{if } k = 0 \end{cases}$$

where,
(i) $T_W^v$ is the arriving packet's waiting time,
(ii) k is the number of packets currently in the queue,
(iii) X is the residual time of the packet being processed at the arrival instant,
(iv) $T_{P_\#}^v$ is the time needed to process a packet ($P_\#$) ahead in the queue, $$P(T_W^v > d^v) = \sum_{k=0}^{\infty}(1 - \rho_v)\rho_v^k F^{(n+1)*}(d^v)$$

where,
(i) $P(T_W^v > d^v)$ is the probability of the waiting time in the VNF ($T_W^v$) of each packet being higher than the maximum processing delay ($d^v$) (e.g., a constraint violation probability (355)),
(ii) $\rho_v = \lambda^v/\mu^v$ is the system utilization factor, the ratio between the arrival rate ($\lambda^v$) (350) and the service rate ($\mu^v$) (352),
(iii) $F(t) = e^{-\mu^v t}$ is the processing time distribution function,
(iv) $F^{(n+1)*}$ is the Erlang-(n+1) distribution with parameter $\mu^v$, Thus:

$$P(T_W^v > d^v) = \sum_{k=0}^{\infty}\sum_{n=0}^{k}(1 - \rho_v)\rho_v^k \frac{(\mu^v d^v)^n}{n!}e^{-\mu^v d^v} \quad \text{(i)}$$

$$P(T_W^v > d^v) = \sum_{n=0}^{\infty}\sum_{k=n}^{\infty}(1 - \rho_v)\rho_v^k \frac{(\mu^v d^v)^n}{n!}e^{-\mu^v d^v} \quad \text{(ii)}$$

$$P(T_W^v > d^v) = \sum_{n=0}^{\infty}\frac{(\mu^v \rho_v)^n}{n!}e^{-\mu^v d^v} \quad \text{(iii)}$$

$$P(T_W^v > d^v) = e^{-(\mu^v - \lambda^v)d^v}, \, d^v \geq 0 \quad \text{(iv)}$$

As an example, if the probability of the waiting time in the VNF of each packet being higher than the maximum processing delay (e.g., a constraint violation probability (355)) is greater than the upper threshold ($P(T_W^v > d^v) > \theta^{upper}$), a scale-up procedure for a VNF may be executed.

Alternatively, as another example, if the probability of the waiting time in the VNF of each packet being higher than the maximum processing delay (e.g., a constraint violation probability (355)) is below the lower threshold ($P(T_W^v > d^v) < \theta^{lower}$), a scale-down procedure for a VNF may be executed.

FIG. 4

Figure 4:
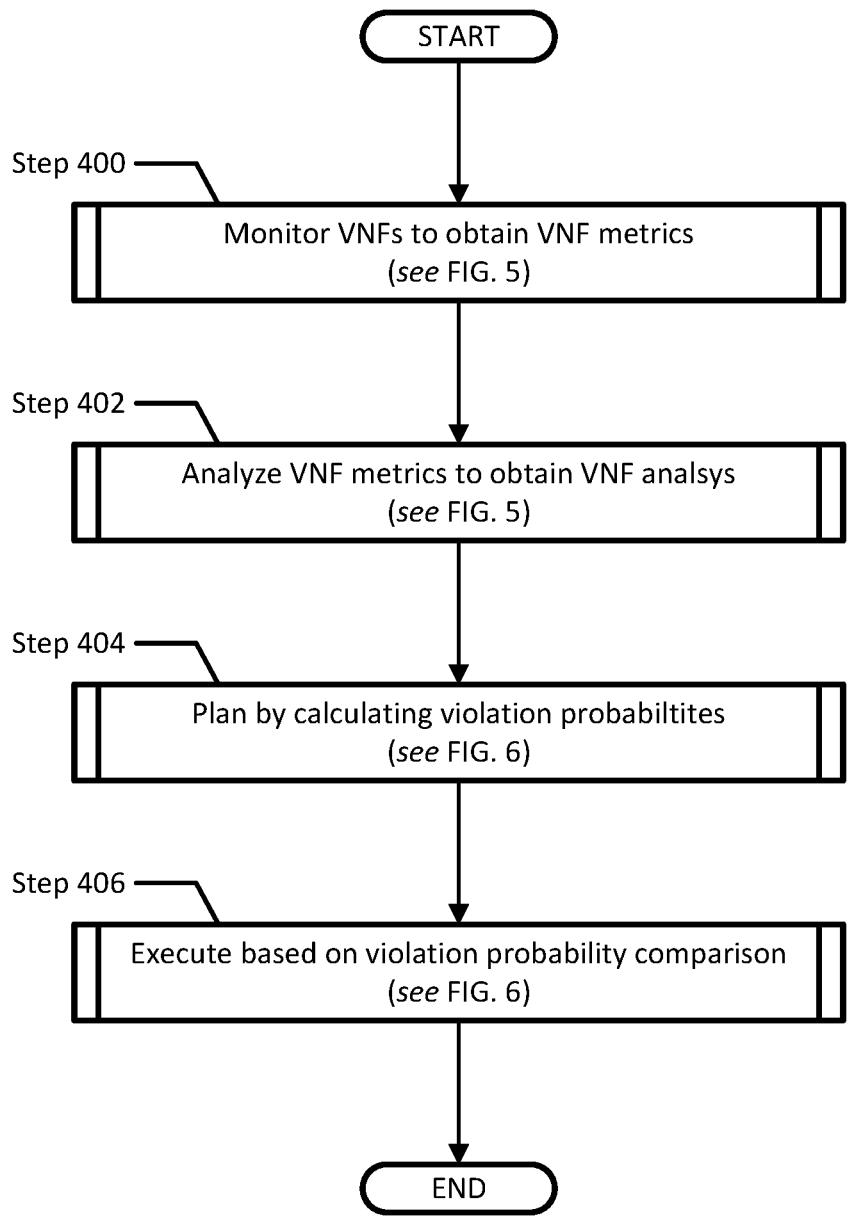
FIG. 4 shows a flowchart of a method for monitoring, analyzing, planning, and executing an auto-scaling procedure, in accordance with one or more embodiments.

FIG. 4 shows a flowchart of a method for monitoring, analyzing, planning, and executing an auto-scaling procedure, in accordance with one or more embodiments. All or a portion of the method shown may be performed by one or more components of the system (e.g., a computing device) and/or any of the software executing thereon. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 400, the computing device obtains VNF metrics from one or more VNF(s) and stores the VNF metrics in the VNF metrics database. Additional details regarding the obtaining and storing of VNF metrics may be found in the description of FIG. 5 (specifically, Step 500).

In Step 402, the computing device analyzes the VNF metrics and calculates the arrival rate, service rate, and processing time(s) for the VNFs associated with the VNF metrics. Additional details regarding the analysis of the VNF metrics may be found in the description of FIG. 5 (specifically, Steps 502-510).

In Step 404, the computing device generates a plan (e.g., action) to modify a VNF based on the analysis (performed in Step 402) and based on the comparison between the processing time(s) calculated for the VNF(s) and the constraints for the larger SFC. Additional details regarding the generation of plans for the VNF may be found in the description of FIG. 6 (specifically, Steps 600-606 and 610).

In Step 406, the computing device executes (i.e., implements) the plan (generated in Step 404) to scale-up, scale-down, or do nothing to a given VNF. Additional details regarding the execution of VNF scaling may be found in the description of FIG. 6 (specifically, Steps 608 and 612).

While FIG. 4 show a definitive "Start" and "End" to the disclosed method, one of ordinary skill in the art would appreciate that the method shown may repeat indefinitely.

FIG. 5

Figure 5:
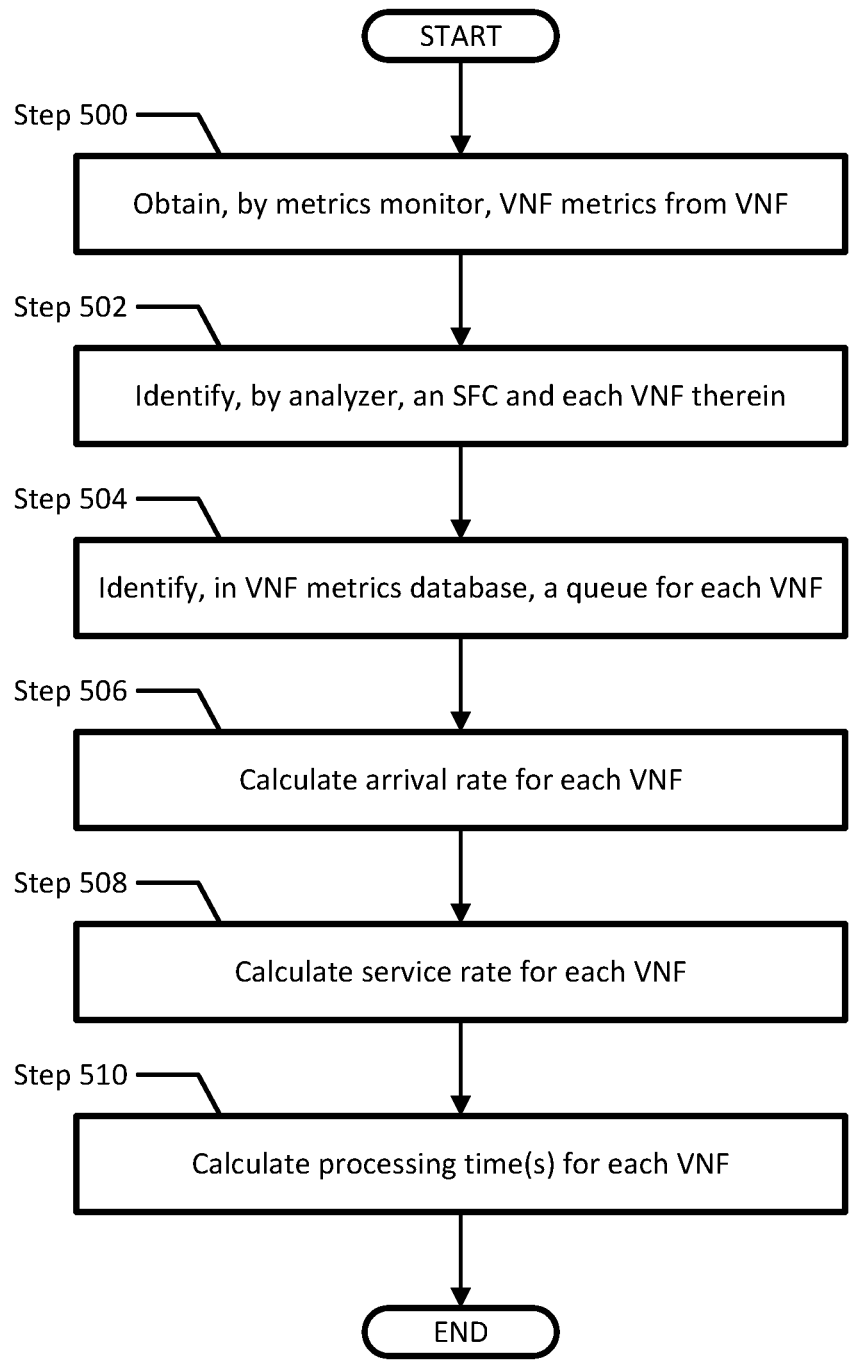
FIG. 5 shows a flowchart of a method for monitoring and analyzing VNF metrics, in accordance with one or more embodiments.

FIG. 5 shows a flowchart of a method for monitoring and analyzing VNF metrics, in accordance with one or more embodiments. All or a portion of the method shown may be performed by one or more components of the virtual system (e.g., the metrics monitor and the analyzer). However, another component of the virtual system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 500, the metrics monitor obtains VNF metrics from one or more VNFs. In one or more embodiments, the metrics monitor may obtain VNF metrics at regular intervals (e.g., every 10 milliseconds, 1 minute, 5 hours, etc.). Further, once obtained, the metrics monitor stores (i.e., saves, writes) the VNF metrics to the VNF metrics database (appending newer data to existing, historical data). In one or more embodiments, the VNFs metrics for each VNF are stored in a VNF metrics entry that is unique to the VNF from which the VNF metrics were obtained. The metrics monitor may obtain the VNF metrics via an application programming interface (API) provided by the VNF and/or the VNF may be modified to write its own VNF metrics to the VNF metrics database.

In Step 502, the analyzer identifies one or more SFC(s) in the edge entities of the system. In one or more embodiments, the analyzer may identify the existence of an SFC by directly querying one or more VNF(s) and identifying associated SFCs, if present. Alternatively, in one or more embodiments, the analyzer may read the VNF metrics database and identify an SFC via an SFC identifier (and further identifying the VNF(s) associated with that SFC).

In Step 504, the analyzer analyzes the "queue" for each VNF via each VNF's uniquely associated VNF metrics entry. In one or more embodiments, the "queue" is a logical construct of the existing VNF metrics data where the analyzer reads and interprets the utilization data to analyze the 'flow' of packets into and out of the associated VNF.

In Step 506, the analyzer calculates the arrival rate of packets for each VNF identified in Step 504. In one or more embodiments, the analyzer may calculate the arrival rate using one of the models available in the model database (e.g., one of the formulas provided in FIG. 3D). In one or more embodiments, the analyzer may calculate the arrival rate by periodically obtaining updated VNF metrics data to count the number of unique packets arriving at the VNF. In one or more embodiments, the utilization data of the VNF metrics data may be sufficiently detailed so as to provide a timestamp of the arrival of each packet in the VNF when the VNF metrics data was obtained. Accordingly, the analyzer may determine the arrival rate for the VNF (and the 'queue' thereof) by analyzing that more detailed VNF metrics data. In one or more embodiments, the analyzer stores the arrival rate for the queue in a VNF analysis entry (in the VNF analysis database) that is unique to the VNF (identified by its unique VNF identifier).

In Step 508, the analyzer calculates the service rate of packets for each VNF identified in Step 504. In one or more embodiments, the analyzer may calculate the service rate using one of the models available in the model database (e.g., one of the formulas provided in FIG. 3D). In one or more embodiments, the utilization data of the VNF metrics data may be sufficiently detailed so as to provide a timestamp of the servicing of each packet in the VNF when the VNF metrics data was obtained. Accordingly, the analyzer may determine the service rate for the VNF (and the 'queue' thereof) by analyzing that more detailed VNF metrics data. In one or more embodiments, the analyzer stores the service rate for the queue in a VNF analysis entry (in a VNF analysis database) that is unique to the VNF (identified by its unique VNF identifier).

In Step 510, the analyzer calculates the processing time for each VNF identified in Step 504. In one or more embodiments, the analyzer may calculate the processing time using one of the models available in the model database (e.g., the "waiting time" formula provided in FIG. 3D). The analyzer may calculate one or more processing time(s) for one or more packet(s) in a single queue. If two or more processing times are calculated, the analyzer may average the processing times to calculate a "mean processing time". In one or more embodiments, the analyzer may identify the "maximum processing time" (i.e., finding the largest processing time of those calculated). In one or more embodiments, the analyzer stores the processing time(s) in a VNF analysis entry that is unique to the VNF.

FIG. 6

Figure 6:
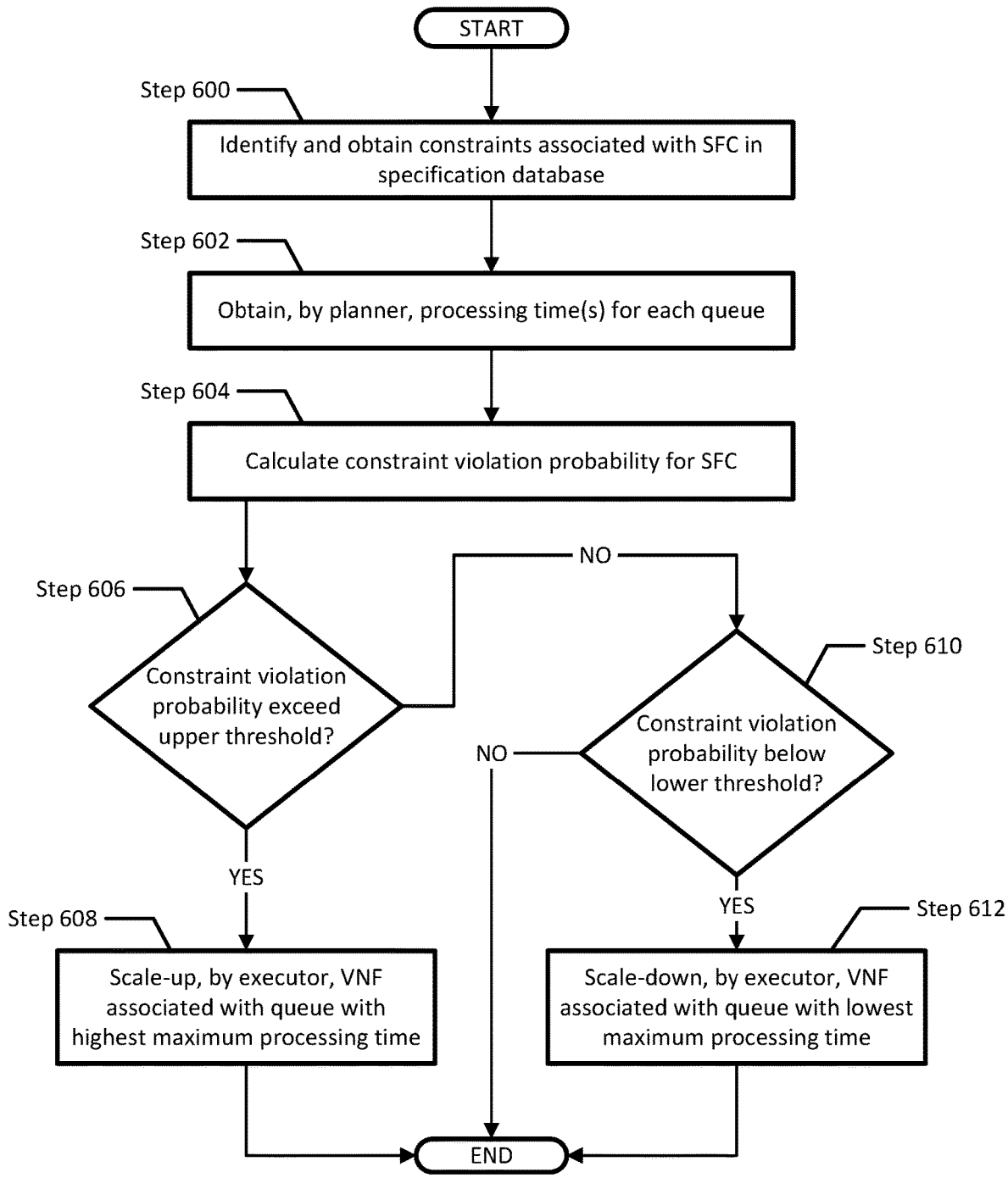
FIG. 6 shows a flowchart of a method for planning and executing an auto-scaling procedure, in accordance with one or more embodiments.

FIG. 6 shows a flowchart of a method for planning and executing an auto-scaling procedure, in accordance with one or more embodiments. All or a portion of the method shown may be performed by one or more components of the virtual system (e.g., the planner and the executor). However, another component of the virtual system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 600, the planner identifies and obtains the constraints associated with an SFC. In one or more embodiments, the planner may read the VNF metrics database and/or the VNF analysis database to identify and select an SFC (e.g., using one or more SFC identifier(s) and further identifying the VNF(s) associated with that SFC). In turn, the planner performs a lookup in the specification database to identify the constraint entry with a matching SFC identifier. Once found, the constraint(s) and threshold(s) from the associated constraint entry are obtained.

In Step 602, the planner obtains the processing time(s), arrival rate, and service rate for each VNF associated with the selected SFC. In one or more embodiments, the planner may read the VNF analysis database to obtain the processing time(s), arrival rate, and service rate calculated by the analyzer.

In Step 604, the planner calculates a constraint violation probability for the SFC. In one or more embodiments, the planner may calculate the constraint violation probability using one of the models available in the model database (e.g., one of the formulas provided in FIG. 3D). In one or more embodiments, the planner uses one or more different models, algorithms, or predictive analysis techniques to calculate a probability that the processing time(s) would violate a constraint associated with the selected SFC.

As a non-limiting example, consider a scenario where a constraint for an SFC is a maximum allowable processing time for a packet (through an entire SFC that includes three VNFs) of 1 second (1,000 milliseconds). The sum of maximum processing times for those three VNFs is found to be 900 milliseconds. Further, the planner identifies that the sum of maximum processing times has increased from 800 milliseconds to the (current) 900 milliseconds in the past 1 minute. Accordingly, the planner may calculate (using one or more models, algorithms, and predictive analysis techniques) that the probability that the maximum processing time is going to violate the constraint is 95%. Accordingly, the constraint violation probability is calculated as 0.95 (in decimal form).

In Step 606, the planner makes a determination if the constraint violation probability exceeds an upper threshold. In one or more embodiments, the planner compares the constraint violation probability (calculated in Step 604) to the upper threshold (obtained in Step 600).

Continuing with the non-limiting example above, if the constraint violation probability is "0.95" and the upper threshold is "0.90" (i.e., 90%), the constraint violation probability would exceed the upper threshold. Alternatively, if the upper threshold is "0.98" (i.e., 98%), the constraint violation probability would not exceed the upper threshold.

If the constraint violation probability exceeds the upper threshold (Step 606—YES), the method proceeds to Step 608. However, if the constraint violation probability does not exceed the upper threshold (Step 606—NO), the method proceeds to Step 610.

In Step 608, the executor scales-up the VNF with the highest maximum processing time. That is, continuing with the non-limiting example above, there are three VNFs for the single SFC. Although the total maximum processing time for all three VNFs is 900 milliseconds, the second and third VNFs each have a maximum processing time of 200 milliseconds. Thus, the first VNF is causing a "bottleneck" in the SFC with a maximum processing time of 500 milliseconds. Accordingly, in such a scenario, the executor would select the first VNF (in the SFC) as the VNF needing to be scaled-up.

In one or more embodiments, scaling-up the VNF may mean (i) allocating additional computing device resources (processor capacity, memory capacity, queue capacity) to the VNF, (ii) initiating another VNF to perform the same functions (and load balance between the VNF instances), or (iii) some combination thereof. In one or more embodiments, the executor may not directly scale-up the VNF, but instead may cause the VNF to be scaled-up by sending a command to a container orchestrator (i.e., a container orchestrator that is managing the VNF), instructing the container orchestrator to scale-up the VNF. As used herein, "scaling-up" includes both directly and indirectly initiating the scale-up of the VNF.

In Step 610, the planner makes a determination if the constraint violation probability is below a lower threshold. In one or more embodiments, the planner compares the constraint violation probability (calculated in Step 604) to a lower threshold (obtained in Step 600).

Continuing with a modified version of the non-limiting example above, if the constraint violation probability is "0.10" (i.e., 10%) and the lower threshold is "0.20" (i.e., 20%), the constraint violation probability would fall below the lower threshold. Alternatively, if the lower threshold is "0.08" (i.e., 8%), the constraint violation probability would not fall below the lower threshold.

If the constraint violation probability falls below the lower threshold (Step 610—YES), the method proceeds to Step 612. However, if the constraint violation probability does not fall below the lower threshold (Step 610—NO), the method may end.

In Step 612, the executor scales-down the VNF with the lowest maximum processing time. That is, continuing with the modified non-limiting example above, there may be three VNFs for the single SFC. Although the total maximum processing time for all three VNFs is 900 milliseconds, the first and third VNFs each have a maximum processing time of 400 milliseconds. Thus, the second VNF has a maximum processing time of only 100 milliseconds—indicating the second VNF is allocated too much processor capacity and/or memory capacity. Accordingly, in such a scenario, the executor would select the second VNF (in the SFC) as the VNF needing to be scaled-down (thereby increasing the maximum processing time for the second VNF).

In one or more embodiments, scaling-down the VNF may mean (i) de-allocating computing device resources (processor capacity, memory capacity, queue capacity) to the VNF, (ii) terminating a duplicative VNF that performs the same functions (shifting more load onto the existing VNF), or (iii) some combination thereof. In one or more embodiments, the executor may not directly scale-down the VNF, but instead may cause the VNF to be scaled-down by sending a command to a container orchestrator (i.e., a container orchestrator that is managing the VNF), instructing the container orchestrator to scale-down the VNF. As used herein, "scaling-down" includes both directly and indirectly initiating the scale-down of the VNF.

What is claimed is:

1. A method for scaling a virtual network function (VNF) by analyzing VNF metrics data, the method comprising:
   obtaining, by a computing device, the VNF metrics data for a service function chain (SFC) executing on a second computing device,
      wherein the SFC comprises a first VNF, a second VNF, and a third VNF;
   determining, using the VNF metrics data, maximum processing times for the first VNF, the second VNF, and the third VNF;
   obtaining a constraint for the SFC;
   calculating a constraint violation probability for the SFC, wherein the constraint violation probability is expressed through a negative exponential function at least reflecting the maximum processing times for the first VNF, the second VNF, and the third VNF;
   making a first determination that the constraint violation probability is greater than an upper threshold;
   based on the first determination:
      making a second determination that the second VNF has a highest maximum processing time relative to the first VNF and the third VNF; and
      based on the second determination, scaling-up the second VNF, wherein scaling up the second VNF comprises initiating a fourth VNF in the SFC on the second computing device,
wherein the second VNF performs a function,
wherein the fourth VNF performs the function,
wherein packets processed by the SFC are load balanced between the second VNF and the fourth VNF.

2. A non-transitory computer readable medium comprising instructions which, when executed by a processor, enables the processor to perform a method for scaling a virtual network function (VNF) by analyzing VNF metrics data, the method comprising:
obtaining, by a computing device, the VNF metrics data for a service function chain (SFC) executing on a second computing device,
wherein the SFC comprises a first VNF, a second VNF, and a third VNF;
determining, using the VNF metrics data, maximum processing times for the first VNF, the second VNF, and the third VNF;
obtaining a constraint for the SFC;
calculating a constraint violation probability for the SFC,
wherein the constraint violation probability is expressed through a negative exponential function at least reflecting the maximum processing times for the first VNF, the second VNF, and the third VNF;
making a first determination that the constraint violation probability is greater than an upper threshold;
based on the first determination:
making a second determination that the second VNF has a highest maximum processing time relative to the first VNF and the third VNF; and
based on the second determination, scaling-up the second VNF,
wherein scaling up the second VNF comprises initiating allocation of additional hardware resources on the second computing device to the second VNF.

3. A computing device, comprising:
a processor; and
memory comprising instructions which, when executed by the processor, enables the processor to perform a method for scaling a virtual network function (VNF) by analyzing VNF metrics data, the method comprising:
obtaining the VNF metrics data for a service function chain (SFC) executing on a second computing device,
wherein the SFC comprises a first VNF, a second VNF, and a third VNF;
determining, using the VNF metrics data, maximum processing times for the first VNF, the second VNF, and the third VNF;
obtaining a constraint for the SFC;
calculating a constraint violation probability for the SFC,
wherein the constraint violation probability is expressed through a negative exponential function at least reflecting the maximum processing times for the first VNF, the second VNF, and the third VNF;
making a first determination that the constraint violation probability is greater than an upper threshold;
based on the first determination:
making a second determination that the second VNF has a highest maximum processing time relative to the first VNF and the third VNF; and
based on the second determination, scaling-up the second VNF,
wherein scaling up the second VNF comprises sending a command to a container orchestrator that is managing the second VNF to scale up the second VNF.

* * * * *